July 26, 1927.
C. W. LOVERIDGE
1,637,308
TELPHER OR OVERHEAD TRANSPORTER SYSTEM
Filed April 13, 1925     2 Sheets-Sheet 1
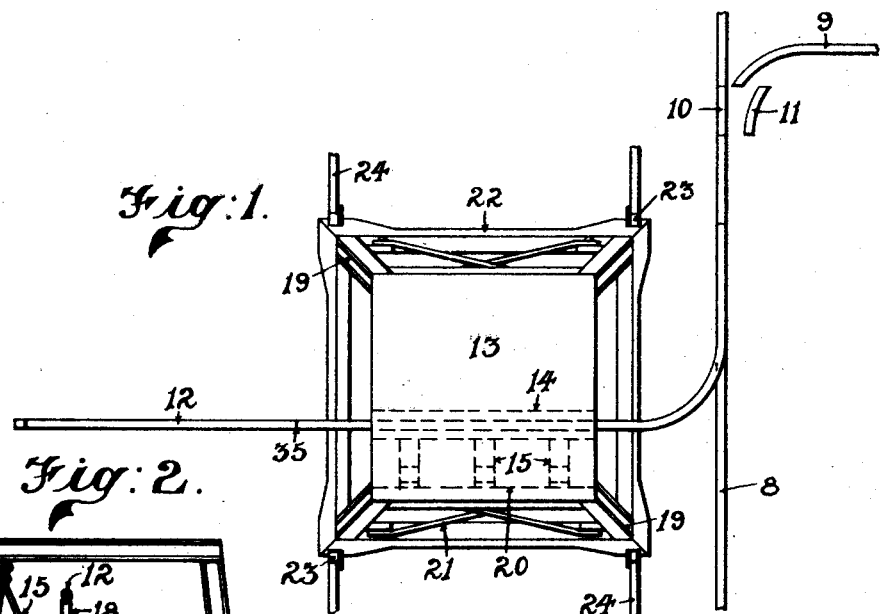
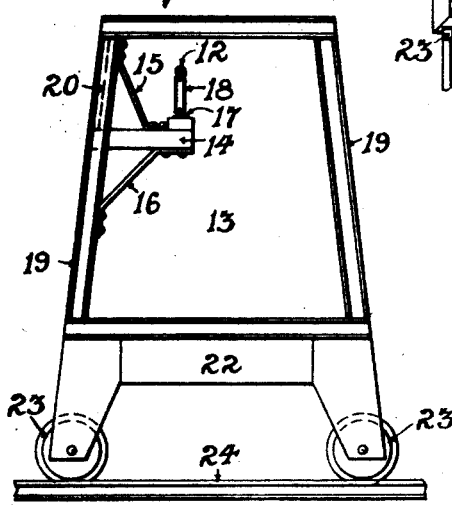
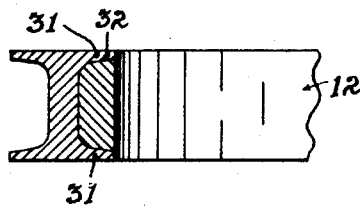
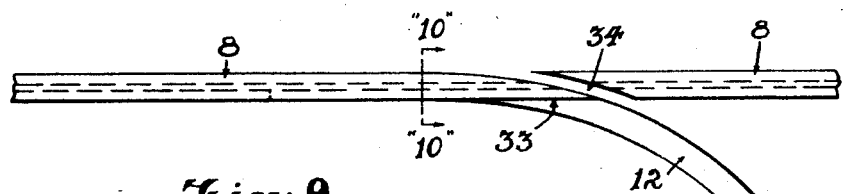
Inventor:-
Claude Warren Loveridge
By His Attorney July 26, 1927.
C. W. LOVERIDGE
1,637,308
TELPHER OR OVERHEAD TRANSPORTER SYSTEM
Filed April 13, 1925   2 Sheets-Sheet 2
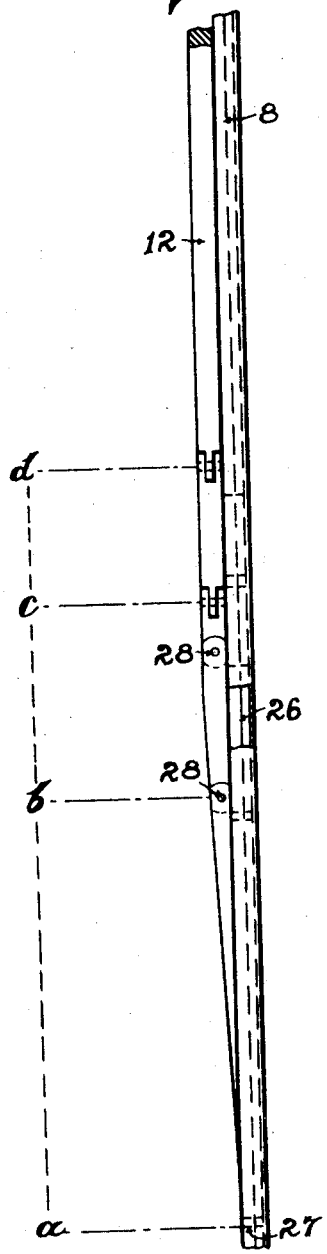
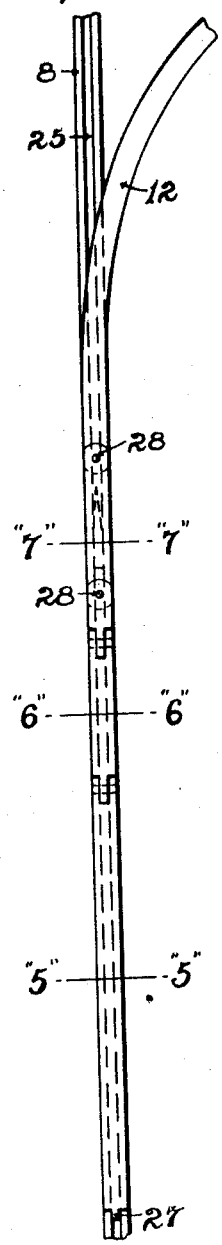
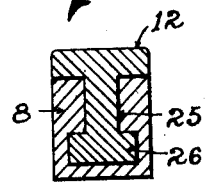
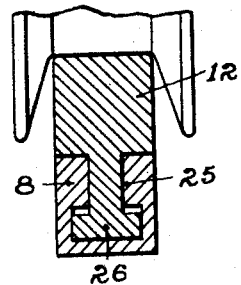
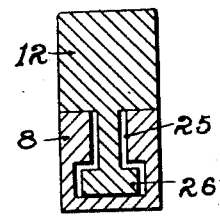
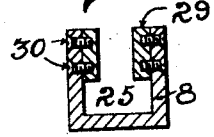
Inventor:-
Claude Warren Loveridge
By His Attorney Patented July 26, 1927.

1,637,308

UNITED STATES PATENT OFFICE.

CLAUDE WARREN LOVERIDGE, OF MANCHESTER, ENGLAND.

TELPHER OR OVERHEAD TRANSPORTER SYSTEM.

Application filed April 13, 1925, Serial No. 22,918, and in Great Britain June 19, 1924.

In telpher or overhead systems as hitherto known except where a transporter bridge is employed the rails which constitute the system are fixed, and as a result when a vessel or conveyance is to be loaded or unloaded by means of the transporter carriage and its hoist the said vessel or conveyance must take up its position under one of the fixed rails. This is not always convenient—as for instance where a vessel has various hatches which have to get consecutively under the carriage, thus necessitating movement of the vessel.

The present improvements have for their object a means for avoiding this necessity of positioning the load-bearing conveyance to suit the position of a telpher rail and the carriage running thereon. According to the said improvements I provide a system with the required number of fixed rails, a rail which is movable without affecting its continuity of track with one of the other rails, and means for supporting and moving such movable rail. The latter can thus be easily and quickly adjusted in relation to the vessel as required.

A very convenient method of carrying the invention into effect will now be described with reference to the accompanying drawings, wherein:

Figure 1 is a diagrammatic plan view of the movable rail and its support in its relation to a fixed rail of the telpher system;

Figure 2 is a view, at right angles to Figure 1, of the support;

Figure 3 is a side elevation of part of a fixed rail of the system and of part of a movable rail, showing a means for movably connecting the two rails;
Figure 4 is a plan of the rails of Figure 3;

Figures 5, 6, and 7 are respectively cross sections taken on lines 5—5, 6—6 and 7—7 of Figure 4; drawn to an enlarged scale.

Figure 8 is a section of the fixed rail of Figures 3 and 4 showing one method of construction of same for the purpose to be described and Figures 9 and 10 are respectively a plan and section taken on line 10—10 of Figure 9, (the latter being to an enlarged scale) of a modification of the means for movably connecting the two rails.

The drawings are not to any special scale.

Referring to the drawings, Figures 1 and 2, 8 and 9 are parts of rails of an overhead transporter system, with a switch for connecting or disconnecting them as shown diagrammatically at 10, 11 and as known. 12 is a movable rail, supported within the housing 13 and borne therewithin on a support 14 which is secured to the side of the housing and supported by means of the brackets 15, 16.

The movable rail consists of an upper portion 12 with a lower portion 17 and lattice bracing 18, but the members 17 and 18 may be parts of a solid girder rail. The rail as constituted by members 17 and 18 is continued nearly up to that point where the upper running rail portion 12 joins the fixed rail 8, and the lower member 17 of the rail is secured to the support 14 by means of bolts or in any other convenient manner. The housing 13 is shown as consisting of four corner members 19 to two of which are bolted the brackets 16, an upper plate 20 to which the brackets 15 are bolted, and lattice bracing 21, the whole supported on a base 22 with running wheels 23 which run on rails 24, and which rails are parallel to the fixed overhead rail 8.

The inner end of the movable rail member 12 slides on the fixed rail 8 and thus, when the housing is moved, the movable rail is moved to any position within the limits of the fixed rail to bring its free end over any point desired.

The method illustrated in Figures 3 and 7 of the drawings, of securing the movable rail 12 to the fixed rail to ensure continuity of track at any relative position of the fixed and movable rail, will now be described. The fixed rail 8 is of the section shown in Figure 8, that is to say it has a longitudinal central groove 25 which is undercut and into this groove fits, with a sliding fit, a tongue 26 formed on the lower face of part of that length of the rail 12 which comes over the fixed rail 8. The movable rail 12 is not of the same height throughout; its upper surface rises gradually as shown in Figure 3 to a height above the fixed rail which will ensure that the wheel flanges on a transporter carriage, travelling from left to right of Figure 3, will clear the lower and fixed rail, and pass freely on to the curved portion of the movable rail. The tongue 26 of the movable rail being of the general form shown in the sections, Figures 5, 6, and 7 ensures that there shall be no undesired lifting of the upper movable rail, whilst allowing for easy sliding relation between the rails. To ensure this easy sliding relation I may where desirable provide anti-friction rollers between the sliding surfaces. The manner of fitting such rollers is well known, and need not be described here.

The tongue 26 is continued for a short distance beyond the end of the rail 12 as shown at 27 in Figures 3 and 4, for additional steadiness of the said rail 12 as a transporter carriage wheel comes upon or leaves its inclined face.

Where a switch is fitted as shown at 10, Figure 1, the straight portion of such switch is of the same cross section as the rail 8 itself.

Where it is possible to have a very rigid and substantial means for supporting the movable rail 12, as it slides in relation to the fixed rail 8, the tongue 26 may be in one sliding fit within the groove in the said fixed rail, with any desired clearance, lateral and vertical to allow movement of the tongue. In other cases the movable rail 12 and tongue 26 may be formed in sections which are articulated to allow of vertical movement of a section or sections, and vertical and/or lateral movement of another section or other sections. A convenient method of effecting this is illustrated in Figures 3 to 8 inclusive, and will now be described with reference to these figures. Between the points a . . . b indicated in Figure 3 the tongue 26 is an easy sliding fit, within the groove 25 in the fixed rail 8, as shown in the section Figure 5. A transporter carriage wheel will thus roll upon or leave the movable rail smoothly and evenly, and there being no clearance between the tongue and groove sides there is no danger of a wheel flange mounting the fixed rail 8 or coming into contact with the tongue end. Between the points b . . . c the relative dimensions of the tongue 26 and groove 25 are substantially as shown in section Figure 6, that is to say, some vertical clearance is allowed but no side play. The section of movable rail and tongue between these two points is jointed to the adjacent sections by means of strong pins or the like 28 which pass through the tongued and grooved ends of adjacent sections as shown in Figures 3 and 4. Between the points c . . . d joints as shown at 28 are also provided and a clearance is left to allow of both lateral and vertical motion of the tongue (and consequently of that section of rail 12) in relation to the groove 25—see section Figure 7—the tongue tapering off within the groove as shown in dotted lines in the plan, Figure 4.

By the above construction the movable rail 12 has a firm sliding connection with the fixed rail 8, whilst possessing the capability of yielding under any stresses or strains to which it may be subjected in working.

A convenient method of forming the grooved fixed rail 8 is shown in section in Figure 8. The rail itself is of rolled channel section as shown in that figure, and within the channel are fixed plates 29 by means of screws or the like 30 the heads of which are countersunk to allow the wheel flanges of a transporter carriage to clear them.

The modification hereinbefore set forth allows of a movable rail being moved to any point of the fixed rail so that transfer of a carriage may take place from one rail to the other at any point along the fixed rail with continuity of track. The rail 12 may thus be moved to any point within its slidable limit to enable the transporter carriage to come over any desired point available within such limit. In Figures 9 and 10 is illustrated a further modification whereby the invention may be utilized where it is sufficient to bring the movable rail over certain predetermined points and maintain continuity of track between the movable and fixed rails when the movable rail is over one of these points. In Figures 9 and 10 is illustrated a means whereby this may be effected. 8 is the fixed rail and 12 the movable rail, the latter sliding between the flanges 31 of the said fixed rail. The movable rail 12 is cut away at 32 so that up to the point 33 where it curves away from the fixed rail 8 the upper surface of the said movable rail is flush with the upper surface of the fixed rail. At this point 33 Figure 9 the movable rail enters below the flange 31 of the fixed rail. The fixed rail is slotted at certain points as shown at 34, the sides of the slot being of arcuate form and one of such sides being in contour a continuation of the curve of the outer edge of the movable rail. Thus, with the latter in position as shown in Figure 9, a transporter carriage wheel will leave the fixed rail 8 and travel along the movable rail 12, slot 34 being wide enough to allow passage of the wheel flange.

When the movable rail is not in position at one of the slots 35, a transporter carriage wheel will travel along the fixed rail and over the slot, the particular formation of the latter ensuring that the wheel shall always be on solid metal. It will be noted, in the modification just described, that the necessity for inclining the running surface of the movable rail where it lies along the fixed rail is dispensed with, and that continuity of track is maintained at any of the predetermined points when the movable rail is moved to such a point. Such continuity is not of course maintained along the whole length of fixed rail 8 as in the first modification.

For very heavy systems to ensure that there shall be no jolting at a slot 34, a portion of rail of appropriate contour and mounted on switch mechanism of any known and suitable type may be provided to close any such slot when it is not required as a movable rail junction, or continuation.

The rails 24 Figures 1 and 2 on which the housing 13 runs are, as will be well understood, laid on a solid foundation so that the relation of the movable rail 12 to the fixed rail 8 will not be disturbed. Should it be necessary through accidental subsidence of the roadway on which the rails 24 are laid, the movable rail 12 may again be raised to the correct height by means of blocks laid on the support 14 within the housing 13 to raise the rail 12 to the desired height. Or, the road wheels 23 may be provided with any known convenient means for taking up wear or to adjust the running level of the housing 13.

To ensure that the housing 13 may hold the movable rail securely at any point to which the said rail may be adjusted, any or all of the wheels 23 of the said housing 13 may be furnished with efficient braking means.

The movable rail 12 where it is employed for instance as part of a ship unloading or loading system is hinged as indicated at 34 Figure 1, so that it may be raised to clear the ship's funnels and bridge or other equipment when the said rail is moved. This raising and the subsequent lowering of the rail may be effected by any means, such as a hoisting drum, within the housing 13 with necessary guides, supports, and stabilizing means as known in the art of crane building, with particular relation to luffing jibs.

It will be understood that I do not confine myself to the particular method of supporting the movable rail by means of the housing 13, and that any means of supporting the rail 12 in such a manner that it will run truly parallel to the fixed rail 8 may be adopted, to suit particular circumstances and the loads to be borne by the transporter carriage and the length of the movable rail from end to end thereof.

I claim:—

1. In a telpher system a fixed rail, a movable rail one end of which curves towards the fixed rail, and makes sliding contact therewith, a groove formed in the upper face of the fixed rail, a tongue formed on the lower face of one end of the movable rail and engaging in the said groove, such rail end and the tongue being in articulated sections, and an extremity on the movable rail which extremity is bevelled off on its upper face to zero.

2. In a telpher system a fixed rail, a movable rail having a joint formed in the length thereof and one end of which rail curves towards the fixed rail, and makes sliding contact therewith, a groove formed in the upper face of the fixed rail, a tongue formed on the lower face of one end of the movable rail and engaging in the said groove, such rail end and the tongue being in articulated sections, and an extremity on the movable rail which extremity is bevelled off on its upper face to zero.

3. In a telpher system a fixed rail, a movable rail one end of which curves towards the fixed rail, and makes sliding contact therewith, a groove formed in the side of the fixed rail and a tongue formed in the side of the movable rail, the said tongue engaging in the said groove and the upper surface of the two rails being flush, the fixed rail having arcuate slots formed therein at intervals.

4. In a telpher system a fixed rail, a movable rail having a joint formed in the length thereof and one end of which rail curves towards the fixed rail, and makes sliding contact therewith, a groove formed in the side of the fixed rail and a tongue formed in the side of the movable rail, the said tongue engaging in the said groove and the upper surface of the two rails being flush, the fixed rail having arcuate slots formed therein at intervals.

In testimony whereof I have hereunto set my hand.

CLAUDE WARREN LOVERIDGE.